United States Patent [19]

Gugler

[11] 3,865,963

[45] Feb. 11, 1975

[54] METHOD FOR FOLDING DOUGH

[76] Inventor: Victor F. Gugler, 8920 Helen Ave., Sun Valley, Calif. 91352

[22] Filed: Sept. 11, 1972

[21] Appl. No.: 288,146

Related U.S. Application Data

[62] Division of Ser. No. 104,447, Jan. 6, 1971, Pat. No. 3,710,731.

[52] U.S. Cl. .................................. 426/297, 426/502
[51] Int. Cl. ....... A21d 8/02, A21c 3/00, A21c 9/04
[58] Field of Search ........... 99/86, 92; 426/297, 502

[56] References Cited
UNITED STATES PATENTS 3,276,397  10/1966  Poppe et al. .............................. 99/92
3,388,997  6/1968  Schaible et al. ......................... 99/92

*Primary Examiner*—James R. Hoffman
*Attorney, Agent, or Firm*—Harris, Kern, Wallen & Tinsley

[57] ABSTRACT

Method for forming folded dough sections for Danish pastry and the like wherein a relatively thin sheet of dough is fed onto a conveyor belt. The dough sheet is severed into sections and periodically a portion of the conveyor belt system is swung upwardly and rearwardly and then downwardly and forwardly to fold at least a forward portion of each dough section back over a rear portion thereof to produce a series of folded dough sections.

2 Claims, 7 Drawing Figures

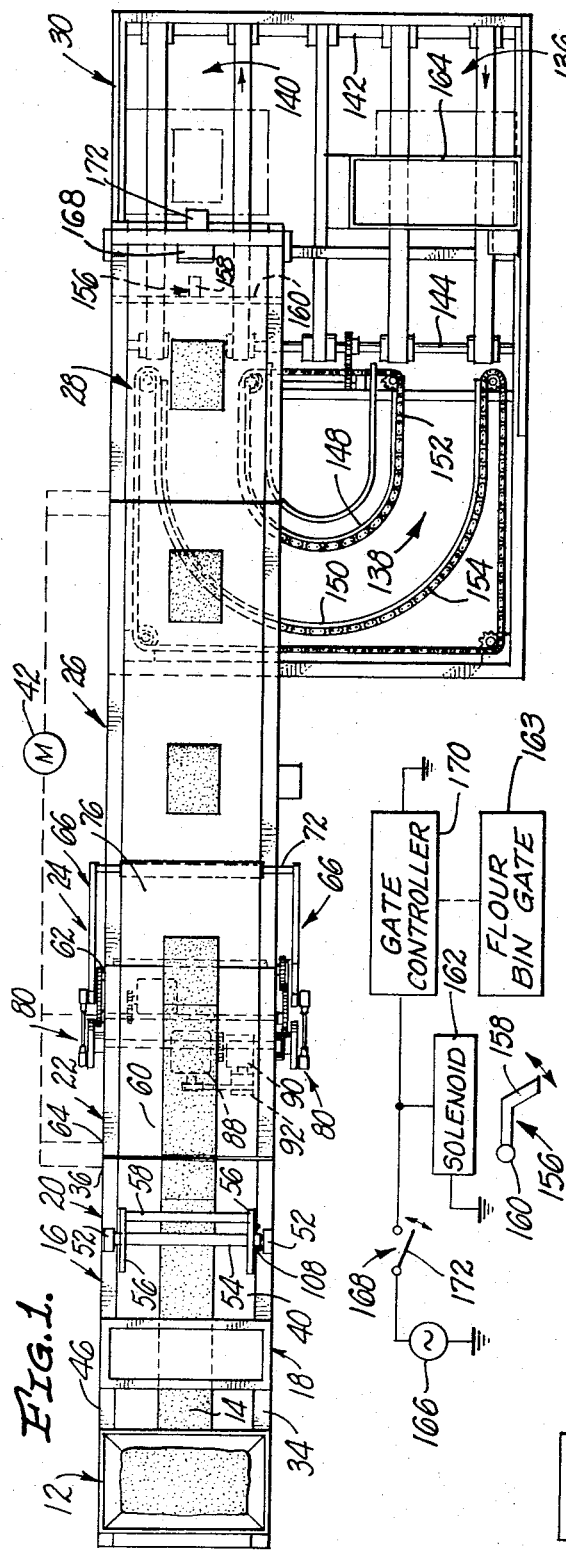

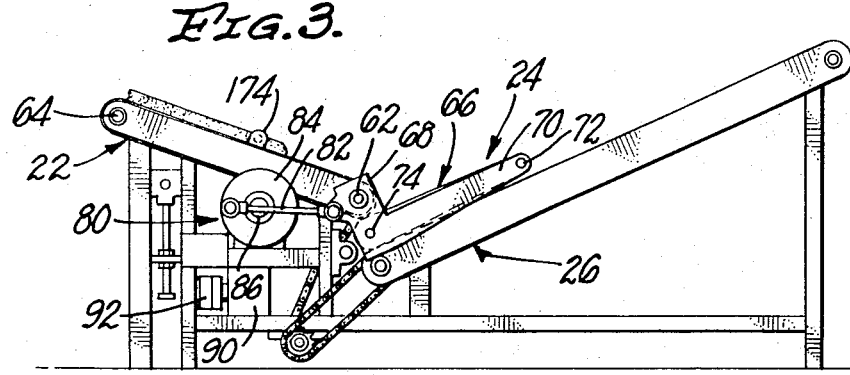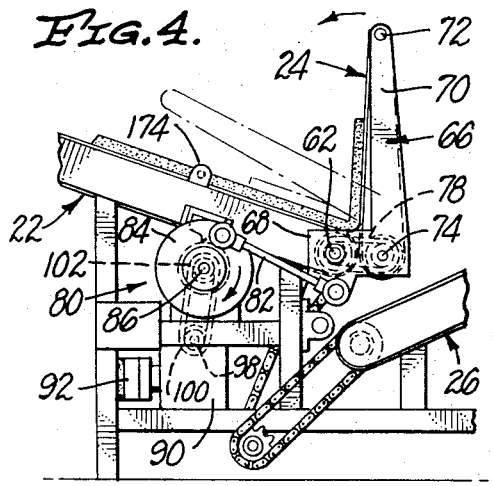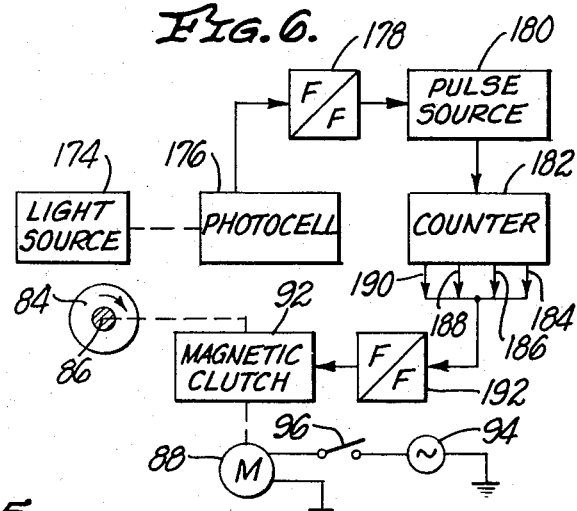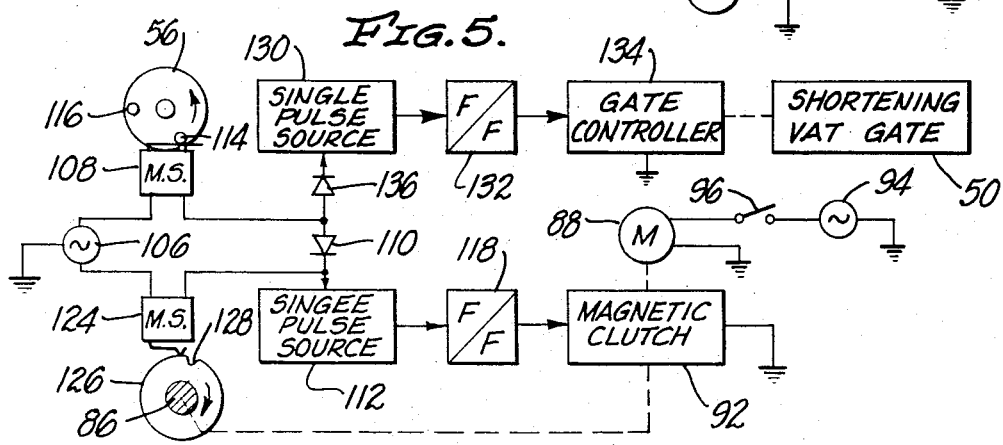

METHOD FOR FOLDING DOUGH

This is a division of application Ser. No. 104,447, filed Jan. 6, 1971, now U.S. Pat. No. 3,710,731.

The present invention relates to an improved method and apparatus for automatically forming folded dough sections for Danish pastry and the like.

In the forming of Danish and puff pastry and the like, it is presently the practice to apply shortening to a flat sheet of dough and to then fold the dough to form a folded dough section with alternate layers of dough and shortening. After refrigeration for a period of time, the folded dough section is fed through a sheeter to flatten the dough section and the application of shortening and folding operations are repeated. The refrigeration and refolding steps may be repeated as many as five times before the finally folded dough section is baked to produce the desired Danish or puff pastry.

In bakeries today, the shortening application and folding steps are commonly done by hand and for that reason are quite slow. If mass production of Danish and puff pastry is desired, a large number of workmen is required. Thus, not only is the production of Danish and puff pastry by present day methods relatively slow, because of the number of workmen required it is also relatively expensive. The expense of course is passed onto the ultimate consumer.

In view of the foregoing, it is an object of the present invention to provide an improved process and apparatus for rapidly forming folded dough sections for Danish pastry and the like and which requires a minimum of personnel.

Another object of the present invention is to provide an improved process and apparatus for automatically and continually processing dough and forming folded dough sections as dough is fed along a system moving conveyor belts.

A further object of the present invention is to provide an improved process and apparatus for forming folded dough sections for Danish pastry and the like including apparatus for continuously feeding a sheet of dough onto a moving conveyor belt, periodically severing the sheet into sections and mechanically folding forward portions of each section back over rear portions thereof to automatically form a series of folded dough sections of desired size and consistency.

Still another object of the present invention is to provide an improved process and machinery of the foregoing character further including means for automatically feeding folded dough sections onto pans for storage in refrigeration rooms.

A still further object of the present invention is to provide an improved process and machinery of the foregoing character further including means for automatically dispensing measured quantities of shortening onto predetermined portions of the sheet of dough as it travels on the moving conveyor belt whereby the folded dough sections include alternate layers of dough and shortening.

Further objects and features of the present invention may be more clearly understood by reference to the following detailed description when considered with the drawings which, by way of example only, illustrate various apparatus for forming and folding dough and which embody the features of the present invention.

In the drawings:

FIG. 1 is a diagrammatic top view of apparatus including a conveyor belt system for processing dough to continuously form folded sections;

FIG. 2 is a diagrammatic side view of the apparatus illustrated in FIG. 1;

FIG. 3 is a diagrammatic side view of a portion of the apparatus illustrated in FIG. 2 (slightly enlarged) and which may be independently employed to refold previously folded dough sections after they have been transported from a refrigeration room and sheeted;

FIG. 4 is a fragmentary diagrammatic side view of a portion of the apparatus illustrated in FIG. 3 showing the apparatus in operation;

FIG. 5 is a schematic-block diagram of circuitry for controlling and synchronizing the application of shortening to a moving sheet of dough and for controlling the folding of the dough sections to produce folded dough sections of alternate layers of dough and shortening;

FIG. 6 is a schematic-block diagram of circuitry for controlling the automatic folding apparatus of FIG. 3 and including a photocell and light source; and FIG. 7 is a schematic-block diagram of circuitry for controlling the feed of pans under an end of the conveyor belt system and for controlling the application of flour to the pans.

Generally speaking, and with reference to the apparatus shown in FIGS. 1 and 2, in the process of the present invention, dough is pumped by a pump 10 from a hopper 12 as a relatively thin, narrow strip 14 onto a moving conveyor 16 and under a vat 18 containing shortening. The shortening is dispensed from the vat 18 in controlled quantities over predetermined portions of the strip of dough 14 as it passes under the vat. The strip of dough is then periodically severed into dough sections by operation of a cutter 20. The dough sections pass from the cutter onto a second conveyor 22 and hence to a third conveyor 24.

The conveyor 24 is adapted to swing between a first position as shown in FIG. 3 and a second position shown in broken outline in FIG. 4. The swinging motion is synchronized with the operation of the cutter 20 to fold a forward portion of each dough section back upon itself and to repeat the folding operation at least once for each dough section to produce a series of folded dough sections having alternate layers of dough and shortening.

From the conveyor 24, the folded dough sections travel in series to fourth and fifth conveyors 26 and 28. At the end of the conveyor 28, the folded dough sections pass in series onto prefloured pans fed in synchronism from a pan conveyor 30.

In the process of the present invention all that is required is one workman to supply empty pans to and to remove full pans from the pan conveyor 30, as for placement in a refrigeration room. The balance of the process is automatic including the steps of dispensing measured quantities of shortening and the folding of dough sections. The operation of the process is limited in speed only by the speed of the dough pump, cutter, and conveyors and therefore is much more rapid than the conventional manual-mechanical process heretofore described. The increased speed of operation and reduction in personnel result in substantial cost savings which can be passed on to the consumer as reduced prices for Danish and puff pastry.

Referring now more specifically to the drawings, with the exception of the third conveyor 24, each of the conveyors includes a table structure having vertical legs extending from the floor with parallel side members. The side members support forward and rear shafts around and between which pass continuous conveyor belts. Thus, for example, in the first conveyor 16, the table includes four vertical legs 32 supporting two parallel side members 34. Journalled at forward and rear ends of the side members are forward and rear shafts 36 and 38 around which pass a continuous conveyor belt 40. A top surface of the belt 40 is continuously moving in a forward direction by virtue of the continuous turning of the forward shaft 36. In this regard, the shaft 36 is connected to a motor drive diagrammatically illustrated at 42. The motor drive 42 also drives the belts of the conveyors 22, 26, and 28 in a forward direction by virtue of appropriate couplings. The conveyor belt of the third conveyor 24 is driven from the forward shaft of the conveyor 22 as will be described more fully hereafter.

In the apparatus illustrated in FIGS. 1 and 2, the dough hopper 12 is supported over the conveyor belt 40 by verticals 44 extending from the side members 34 of the support table. A lower end of the hopper 12 is open and is connected to the pump 10, which, by way of example, may be of a positive displacement type having a nozzle 46 with a relatively wide mouth spaced just above the upper surface of the belt 40. In operation, movement of the belt in a forward direction in combination with the operation of the pump 10 causes dough to flow as a relatively thin, narrow strip onto the belt 40 and in a forward direction and under the vat 18 and cutter 20.

Like the hopper 12, the vat 18 is supported over the conveyor belt 40 by vertical arms 48 extending upwardly form the side members 34. A lower opening in the vat 18 is normally closed by a gate 50 or similar structure. When the gate is opened, the vat 18 dispenses a measured quantity of shortening onto the moving strip of dough. In the present invention, the dispensing of shortening from the vat 18 is sychronized with the operation of the cutter 20 and folding operation of the third conveyor 24 such that shortening is evenly spread over the upper surface of about the rear two-thirds of each dough section. This operation and the control therefor will be described in detail later.

The cutter 20 comprises a pair of verticals 52 extending upwardly from the side members 34 for supporting opposite ends of a horizontal shaft 54. Two wheels 56 are secured to the shaft, one adjacent each of the verticals 52. The wheels are positioned to engage and turn with forward motion of the upper surface of the belt 40. A cutting blade 58 extends between the wheels 68 such that a turning of the wheels periodically drives the blade downward through the dough strip to sever the strip into a series of dough sections without cutting or otherwise damaging the belt 40.

The dough sections generated by the cutter 20 pass in series from a forward end of the conveyor belt 40 and onto a rear end of the belt for the conveyor 22. In the illustrated form of the present invention, the conveyor 22 includes a conveyor belt 60 extending between and supported by forward and rear shafts 62 and 64. The conveyor belt 60 is inclined downwardly in a forward direction toward and is adapted to feed the dough sections in a downward direction onto the third conveyor 24 for the automatic folding operation.

In the illustrated form of the invention, the third conveyor 24 is normally mounted in a first position as depicted in FIG. 3. In that position, the conveyor 24 is inclined upwardly in a forward horizontal direction above the top surface of the fourth conveyor 26 and with a rear end of the conveyor 24 lying below the forward end of the conveyor 22. To provide such support for the conveyor 24, as well as to permit the conveyor to swing upward and rearward and then downward and forward between the first position and a second position illustrated in phantom outline in FIG. 4, the apparatus supporting the third conveyor includes a pair of parallel L-shaped support arms 66 having vertically extending short legs 68 and horizontally extending long legs 70. Upper ends of the short legs 68 are journalled for turning on opposite ends of the forward shaft of the second conveyor 22 while opposite ends of forward and rear shafts 72 and 74 for the third conveyor 24 are supported at forward and rear ends of the horizontally extending long legs 70. A continuous belt 76 extends around and between the shafts 72 and 74 to complete the third conveyor 24.

Not only is the third conveyor 24 supported to swing about the forward shaft 62 of the second conveyor 22, but in addition, as illustrated in FIG. 4 by the chain 78, the third conveyor is driven from the shaft 62. Thus, the conveyor belt 76 is continuously driven in a forward direction in synchromism with the conveyor belt 60.

As previously indicated, swinging motion is imparted to the third conveyor 24 to produce an automatic folding of the dough sections fed to it by the second conveyor. Various means may be employed for swinging the third conveyor 24 between its first and second positions. In the form of the invention shown most clearly in FIGS. 3 and 4, drive mechanisms 80 for swinging the third conveyor are located on opposite sides of the second conveyor 22. The drive mechanisms 80 are identical to each other. Thus, only that shown on the side of the conveyor 22, illustrated in FIGS. 3 and 4 will be described in detail. The drive mechanism 80 comprises a drive rod 82 pivotally connected at its forward end to the vertically extending short leg 68 of the support member 66 slightly below the shaft 62 when the member 66 is in its first position as illustrated in FIG. 3. The rear end of the drive rod 82 is pivotally connected to a wheel 84 on a shaft 86 extending under the conveyor 22 for connection to a like wheel in the other drive mechanism 80 on an opposite side of the conveyor. The wheel 84 is turned in a clockwise direction by operation of a motor 88 (illustrated in FIG. 1) connected to a gear train 90 through a magnetic clutch 92. The motor 88 is energized from a current source 94 through a switch 96 (see FIG. 5) while the output of the gear train 90 is connected to a drive sprocket 98 around which extends a drive chain 100. The chain 100 is connected to and extends around a driven sprocket 102 on the shaft 86. Thus, when the magnetic clutch 92 is energized, drive from the motor 88 produces a clockwise turning of the wheel 84. As the wheel 84 turns in a clockwise direction, the drive rod 82 is reciprocated back and forth in a horizontal direction to drive the support arm 66 between its first position illustrated in FIG. 3 and its second position illustrated in FIG. 4. When a dough strip is on the third conveyor 24, such a swinging between the first and second position produces a folding of a forward portion of the dough section back over a rear portion as illustrated in FIG. 4.

Preferably, the folding operation of the third conveyor 24 is started when the forward end of a dough strip reaches a predetermined position on the conveyor. In this regard, operation of the third conveyor may be synchronized with operation of the cutter 20 or the location of a dough section along the moving conveyors 22 and 24 may be detected as by a photosensor to energize the drive mechanism 80 to produce the desired swinging of the third conveyor.

A system for controlling operation of the third conveyor 24 in synchronism with operation of the cutter 20 is diagrammatically illustrated in FIG. 5. The system of FIG. 5 also selectively controls the operation of the shortening vat gate 50 to regulate the dispensing of shortening onto the upper surface of the moving strip of dough 14 passing under the vat 18. As represented, the system comprises a current source 106 connected through a microswitch 108 and a diode 110 to a single pulse source 112 such as a conventional "single-shot" multivibrator. As illustrated in FIGS. 1 and 2, the microswitch 108 is located adjacent the wheel 56 of the cutter 20 with a movable switch arm adapted momentarily to close the microswitch upon engagement with studs 114 and 116. The studs 114 and 116 are angularly spaced from each other on an outer face of the wheel 56 adjacent its periphery and with a turning of the wheel are adapted to selectively engage the switch arm to close the microswitch 108. As will be described, each closing of the microswitch 108 produces a swinging of the conveyor 24 between its first and second positions and a folding of a dough section. In the illustrated form of the invention, two folds are desired for each dough section as it moves along the third conveyor 24. Hence, two studs are employed and they are spaced about 120° apart in a counterclockwise direction as viewed in FIG. 5. If additional folds are desired, additional studs may be included and the spacing altered to effect the desired folding operation. If a single folding operation is desired, a single stud may be utilized.

Upon a closing of the microswitch 108, which of course is momentary because of the continuous turning of the wheel 56, current is applied from the source 106 through the microswitch 108 and diode 110 to the single-pulse source 112. A single pulse is generated by the source and applied to the input to a bistable circuit commonly known as a "flip-flop" and designated by the numeral 118. The flip-flop 118 is a conventional circuit having two stable states or two stages. Upon the receipt of the first pulse from the source 112, the flip-flop assumes a first or "one" condition wherein a relatively high voltage output is produced and applied to the magnetic clutch 92. When the next pulse is received at the flip-flop 118, it "flips" or changes to a second or "zero" state wherein the output is a relatively low voltage. In the first state, the flip-flop 118 energizes the magnetic clutch 92 and in the second state, the magnetic clutch is de-energized.

As previously mentioned, when the magnetic clutch 92 is energized, the output of the drive motor 88 is coupled to the wheel 84 to effect a turning thereof and a swinging of the conveyor 24. Thus, a first closing of the microswitch 108 upon engagement with the stud 114 produces a first swinging of the conveyor 24 between the first and second positions and back again and a first folding of a dough section. By proper location of the stud 114, the first closing of the microswitch is effected when the forward end of the dough section is at a predetermined and desired location on the third conveyor 24. The location is such that upon an upward and rearward swinging of the conveyor 24, a forward one-third of the dough section folds back over a top of a middle one-third of the dough section as illustrated in FIG. 4. The location of the stud 116 is such that a second swinging of the conveyor 24 in response to a second closing of the microswitch 108 causes the previously folded portion of the dough section to be folded back over the rear one-third of the dough section to produce a fully folded dough section.

Since it is desired that the second swinging of the conveyor 24 be regulated by the stud 116, it is necessary to de-energize the magnetic clutch 92 at the end of a full rotation of the wheel 84 and prior to the stud 116 reaching the microswitch 108. This accomplished by a microswitch 124 and cam 126. The cam 126 is mounted on the shaft 86 for turning therewith and is generally circular in shape having a notch 128 in its peripheral surface. The microswitch 124 is stationed immediately adjacent the cam 126 with its movable switch arm riding on the outer surface of the cam. Upon a full rotation of the wheel 84 and hence of the cam 126, the movable switch arm drops into the slot 128 to close the microswitch 124. Current is then applied from the source 106 through the microswitch 124 directly to the single-pulse source 112. The source generates a pulse which upon application to the flip-flop 118 causes the flip-flop to change to its second or "zero" condition thereby de-energizing the magnetic clutch 92. This all occurs prior to the stud 116 reaching the microswitch 108. Thus, immediately prior to the stud 116 engaging microswitch 108, the third conveyor 24 is in its first position and the magnetic clutch 92 is de-energized. Also a partially folded dough section is at the predetermined position on the third conveyor 24; that is, the position where a swinging of the third conveyor will fold the previously folded portion of the dough section back over the rear one-third of the dough section to produce a fully folded dough section.

As previously indicated, the closing of the microswitch 108 by the stud 116 energizes the drive 80 to produce the desired second swinging of the conveyor 24 and second folding of the dough section. At the end of the second folding operation, the drive 80 is de-energized by operation of the microswitch 124 in the manner previously described. The drive 80 remains de-energized until the stud 114 again engages the microswitch 108 to start another folding operation. As illustrated, in the system of FIG. 5, the studs 114 and 116 are 120° apart in a counterclockwise direction. Thus, after the second folding operation, there is sufficient time for the fully folded dough section to completely traverse the conveyor 24 and move onto the conveyor 26 prior to the start of the first folding operation for the next dough section.

As previously mentioned, the system of FIG. 5 also provides selective control over the flow of shortening onto the strip of dough passing under the vat 18. To provide such control in synchronism with the operation of the cutter 20, the system includes a single-pulse source 130 such as a conventional "single-shot" multivibrator, a flip-flop 132, and gate controller 134. Upon the closing of the microswitch 108, as for example, when the switch arm of the microswitch engages the stud 116, current from the source 106 passes through a diode 136 to energize the pulse source 130. The pulse from the pulse source sets the flip-flop 132 in a first or high voltage output condition to energize the gate controller 134. The gate controller may take various forms. For example, it may comprise a solenoid or an electric motor energized during the high voltage output of the flip-flop 132 to mechanically open the gate 50 normally closing the bottom opening of the vat 18. The gate remains open until the gate controller is de-energized at which time the gate automatically closes, as by operation of a spring (not shown) connected to the gate. Such deenergizing of the gate controller 134 occurs when the microswitch 108 is again momentarily closed by contact with the stud 114. When that occurs, a current signal again is applied through the diode 136 to the pulse source 130. A pulse is generated by the pulse source 130 and fed to the flip-flop 132 to set the flip-flop in a "zero" or low voltage output state de-energizing the gate controller.

In the operation just described, the shortening vat gate 50 has remained open during the period of time between the microswitch 108 engaging the stud 116 and engaging the stud 114. This means that shortening is evenly spread by the vat over the upper surface of a portion of the strip which corresponds to the rear two-thirds of a dough section formed by operation of the cutter 20. The forward one-third of the section is free of shortening. However, during the folding operation, the forward one-third is initially folded back over the top of the dough section such that the fully folded dough section includes alternate layers of dough and shortening as is desired in the forming of Danish pastry.

Upon exiting from the forward end of the third conveyor 24, the folded dough sections pass onto the moving fourth conveyor 26. As most clearly illustrated in FIG. 2, the fourth conveyor 26 is upwardly inclined towards its forward end with a rear end lying below the third conveyor 24. The angular arrangement of the second, third, and fourth conveyors minimizes the travel required of the third conveyor to produce the desired folding of the dough sections. The fourth conveyor 26 moves the folded dough sections upwardly and onto a rear end of a fifth conveyor 28 which is downwardly inclined toward the pan conveyor 30.

The pan conveyor 30 is of a conventional "merry-go-round"-type design including a first conveyor belt section 136 followed by an arcuate chain drive section 138 followed by a second conveyor belt section 140 parallel to the first conveyor belt section. The conveyor belt sections are similar to each other and each includes a pair of spaced canvas belts passing around and between shafts 142 and 144 common to the two sections. The sections may be driven from a common motor drive 146 as illustrated.

The chain drive section 138 comprises a pair of upwardly extending inner and outer U-shaped guide members 148 and 150 along which are trained continuous inner and outer chains 152 and 154. The chains pass around sprockets supported on vertical shafts. The outer chain 154 is driven at a higher rate of speed than the inner chain 152 such that pans exiting from the first conveyor belt section 136 onto a top of the chain drive section 138 are slowly turned to follow the path of the inner and outer U-shaped guide members 148 and 150 to the second conveyor belt section 140 under the fifth conveyor 28. Upon reaching a position under the forward end of the fifth conveyor 28, the forwardmost or lead pan is engaged by a stop mechanism 156. This halts motion of a series of pans behind the lead pan despite continuous motion of the conveyor belt sections and chain section of the pan conveyor 30.

In practice, and as diagrammatically represented in FIG. 7, the stop mechanism 156 comprises a finger-like stop member 158 secured to a rocker shaft 160 extending below the belt of the conveyor 28 and between the side support members for the conveyor belt. A solenoid 162 is stationed adjacent the stop member 158 to effect a selective raising thereof to permit the passage of the lead pan under the fifth conveyor 28 to receive a folded dough section exiting therefrom. In this regard, the operation of the stop mechanism 156 is synchronized with movement of the folded dough sections along the fifth conveyor and with operation of a flour bin gate 163 to dispense a measured quantity of flour from a bin 164 onto each pan passing thereunder — the bin being mounted over the first conveyor belt section 136 with the gate 163 normally closing a bottom part thereof.

The controlling system for such operation is illustrated diagrammatically in FIG. 7. As represented, the system includes a current source 166, control switch 168, and gate controller 170 in addition to the solenoid 162. The source is connected through the control switch to the solenoid and the gate controller. The control switch 168 is mounted over the fifth conveyor 28 (see FIGS. 1 and 2) with a finger 172 extending downwardly to engage the folded dough sections as they reach the forward end of the fifth conveyor. Upon engaging a folded dough section, the switch 168 closes to provide a path for current from the source 166 both the solenoid 162 and to the gate controller 170. The solenoid 162 is associated with the stop mechanism 156 and raises the stop member 158 to permit the lead pan to advance under the forward end of the fifth conveyor. As the folded dough section passes onto the lead pan, the finger 172 again falls. This opens the switch 168 and de-energizes the solenoid 162 to reactivate the stop mechanism 156 and halt further motion of the pans on the pan conveyor 30.

The gate controller 170 may take various forms such as a motor connected to the gate 163. Upon energizing the gate controller, the gate 163 is opened and flour falls therefrom onto one of the pans in the series. When the gate controller is de-energized as by an opening of the switch 168, the gate 163 automatically closes as in response to the action of a spring (not shown).

The operation of the solenoid 162 and gate controller 170 is repeated each time a dough section engages the finger 172. Thus, a pan is released from the series each time a dough section reaches the forward end of the conveyor 28 and a measured quantity of flour is dispensed onto a different pan in the series. The stop-start operation of the pans on the pan conveyor 30 has the effect of evenly spreading the flour over the upper surface of the pans to act as a lubricant for the folded dough sections received thereby.

As the folded dough sections pass onto the pans, they move with the pans in series to the forward end of the second conveyor belt section 140. From the second conveyor belt section 140, the pans are mounted on racks and transported to a refrigeration room for cooling. After a predetermined cooling period, the folded dough sections are returned for sheeting, that is, passage between two rollers and subsequent folding operations.

The subsequent folding operations may be accomplished utilizing apparatus conforming to the second, third, and fourth conveyors as illustrated in FIGS. 3 and 4. Motion of the folded dough sections on the second and third conveyors 22 and 24 in such an arrangement may be detected by various means such as a photosensor. A similar arrangement may be employed to detect the position of the dough sections on the third conveyor 24 prior to an initial folding in the apparatus illustrated in FIGS. 1 and 2.

Such a system for controlling the folding operation of the third conveyor 24 is shown in FIG. 6 and includes a light source 174 and a photocell 176. As illustrated in FIGS. 3 and 4, the light source is mounted on one of the side support members of the conveyor 22 while the photocell is mounted on a support member on an opposite side of the conveyor 22 in line with the light source. The photocell 176 receives a light beam from the light source 174 which is broken when a dough section passes therebetween. The output of the photocell 176 is connected to a flip-flop 178 of the type previously described. The output of the flip-flop 178 is connected to a pulse source 180 having its output connected to a counter 182. Certain stages of the counter include output leads 184, 186, 188, and 190 which are connected in common to a flip-flop 192 having its output connected to the magnetic clutch 92. The magnetic clutch 92 controls the transfer of power from the motor 88 to the shaft 86 as previously described.

In operation, when light is blocked from the photocell 176 as by the passage of the forward end of a dough section between the light source and the photocell, the output of the photocell drops. This changes the state of the flip-flop 178 to a high voltage output state to energize the pulse source 180. The pulse source generates a series of pulses, each one advancing the count of the counter 182 and energizing consecutive stages thereof. After a predetermined number of pulses or counts and when a forward end of the dough section reaches a predetermined position on the conveyor 24, a stage of the counter having the output 184 is energized to in turn energize the flip-flop 192. The flip-flop 192 changes to a high output state, energizing the magnetic clutch 92. The output of the motor 88 is then coupled to the shaft 86 to produce a turning of the wheel 84. This in turn produces the previously described swinging motion of the third conveyor 24 from its first position to its second position and back to its first position to produce the desired folding of the forward portion of the dough section.

By proper prearrangement, when the conveyor 24 returns to its first position, the output 186 of the counter is energized. This causes the flip-flop 192 to change to a low voltage output state thereby de-energizing the magnetic clutch 92 and halting further swinging motion of the conveyor 24.

By the time the partially folded dough section reaches the predetermined location on the third conveyor 24, the counter 182 has advanced its count to a state wherein an output 188 is energized. This again causes the flip-flop 192 to change to a high output state, re-energizing the magnetic clutch 92. The energizing of the clutch produces a second folding of the dough section. At the completion of the second folding operation, the output 190 of the counter 182 is energized to change the state of the flip-flop 192 and de-energize the magnetic clutch 92. This again halts further swinging motion of the conveyor 24 until the output 184 of the counter 182 is again energized.

Upon the second de-energizing of the flip-flop 192, the folding of the dough section is complete and the dough section passes from the second conveyor 22 to the third conveyor 24. As this occurs, light again passes to the photocell 176, producing a high voltage output which changes the output state of the flip-flop 178 to de-energize the pulse source 180. The control system remains de-energized until another dough section blocks light from the light source 174 to the photocell 176.

From the foregoing description, it should be appreciated that the present invention provides apparatus and method for automatically and rapidly processing and forming folded dough sections on a continuous basis utilizing a minimum of personnel. Because of the speed of operation of the method and apparatus of the present invention and because of the vast reduction in personnel required to produce folded dough for Danish pastry and the like, the apparatus and method result in a substantial cost saving to the bakery and, hence, to the ultimate consumer purchasing Danish pastry and the like processed by the method and apparatus of the present invention.

While a particular apparatus and process have been described in detail herein, changes and modifications may be made without departing from the spirit of the invention. Therefore, it is intended that the present invention be limited in scope only by the terms of the following claims.

I claim:

1. A process for preparing dough for Danish pastries and the like comprising the steps of:

flowing dough as a narrow strip onto a top surface of a forwardly moving conveyor belt;

severing said strip into dough sections as it moves forward on said conveyor belt; and lifting only a forward portion of each said dough section relative to a rearward portion thereof as it moves forward with said conveyor belt to automatically fold said forward portion rearwardly onto said forwardly moving rearward portion to produce a series of folded dough sections on said conveyor belt.

2. The process of claim 1 further including the step of applying shortening to the upper surface of said strip at spaced intervals such that the upper surface of each of said rear portions of said dough sections has shortening thereon and said forward portion is free of shortening.

* * * * *